April 20, 1965   J. BUMBY   3,179,440
COMPOSITE ARTICULATED VEHICLES
Filed July 6, 1962   2 Sheets-Sheet 2
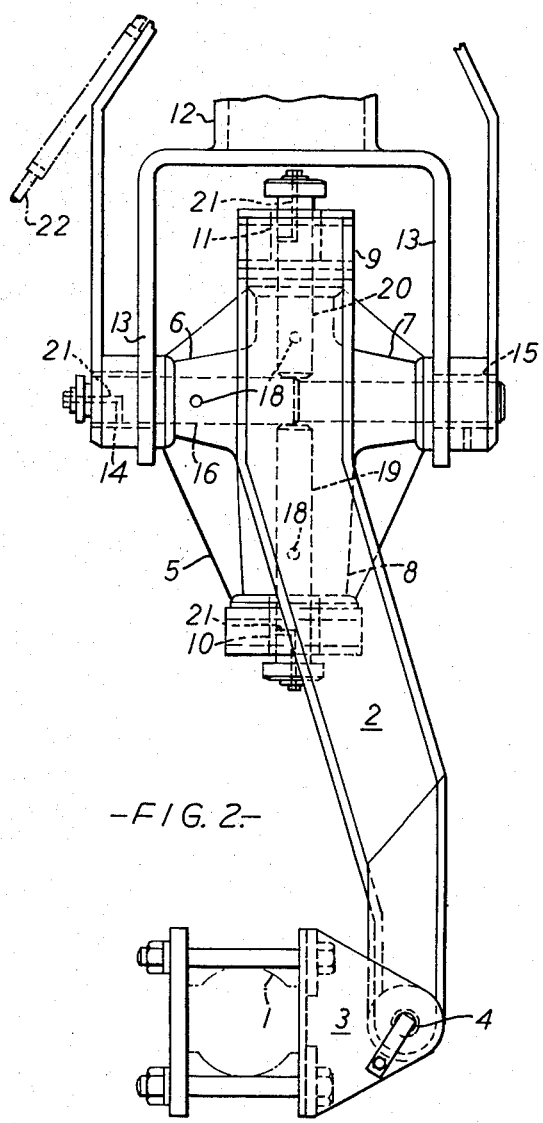
-FIG. 2.-
INVENTOR:
JOHN BUMBY
BY
Abraham A. Saffitz
ATTORNEY

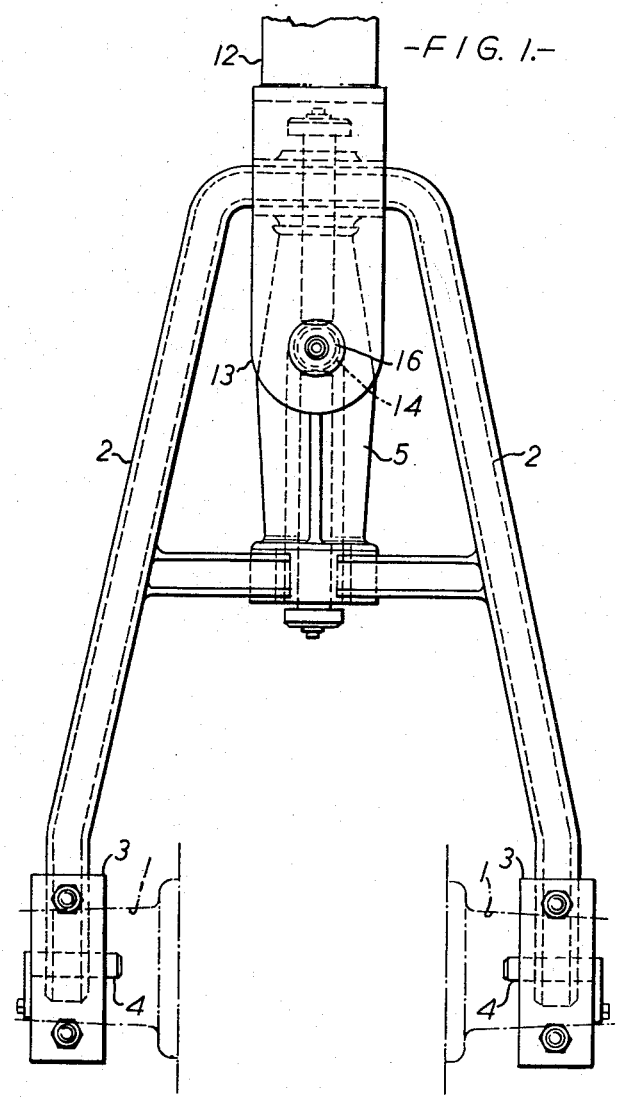

United States Patent Office 3,179,440
Patented Apr. 20, 1965

3,179,440
COMPOSITE ARTICULATED VEHICLES
John Bumby, Bradford, England, assignor to Robert
Hudson Limited, Leeds, Yorkshire, England
Filed July 6, 1962, Ser. No. 207,949
4 Claims. (Cl. 280—492)

The invention relates to composite articulated vehicles of the tractor-trailer type and has as its chief object the provision of a new or improved method of and means for effecting articulated attachment together of the tractor or similar member and the trailer member of the assembly.

Other features and refinements of construction are associated with the invention which will be hereinafter introduced and described.

According to the invention the composite articulated vehicle of the tractor-trailer type is characteristerized in that the front ends of a pair of arms of a tow-bar are attached to the axle or axle casing of the tractor with the rear ends of the arms converging and incorporating a housing furnished with pairs of bores arranged at right angles to each other, and a central forward extension of the trailer frame provided with a forked end and a pair of vertical bores or bearings, in a manner whereby the tow-bar and the trailer frame extension may be articulated together by a stud or studs inserted into the said vertical bores and into the registering bore or bores of the housing and by two more studs inserted into the remaining bores of the aforesaid housing in alignment with the longitudinal center line of the tractor.

In order that the invention may be fully and clearly comprehended the same will now be dscribed with reference to the accompanying drawings, in which:

FIGURE 1 is a plan view of means for articulating a pair of vehicles together according to the invention.

FIGURE 2 is a side elevation corresponding to FIGURE 1 and viewed from the left hand side thereof.

The composite articulated vehicle includes a suitable orthodox tractor or similar towing unit and a suitable trailer vehicle.

The latter is preferably of conventional type which incorporates a body or hopper mounted upon a chassis consisting of a horizontal frame and a pair of transversely aligned stub or other suitable form of axles or shafts carrying road wheels.

To the rear axle casing 1 of the tractor, are pivotally attached the front ends of the arms 2 of a V-shaped or bifurcated tow-bar. A simple method of effecting the said attachment consists in securing a pair of brackets 3 to the axle casing 1 in spaced relationship and pivotally attaching thereto the front ends of the arms 2 by transverse pins 4 passed through bores in the brackets and in the arms. To achieve maximum efficiency of the coupling the pivotal points should be beneath the axle and at or in advance of the axle center.

The rear converging ends of the arms 2 of the tow-bar project beyond the rear of the tractor and are adapted to accommodate a pair of spaced bearings 10 and 11 which are mutually aligned and are also aligned with the longitudinal centre line of the tractor.

A central extension or arm 12 of the aforesaid trailer chassis is arranged to project forwardly of the trailer body (not shown) and to terminate in a vertical forked yoke or stirrup 13, each limb of the yoke having a vertical bore housing a bearing 14, 15.

Located between the limbs of the yoke 13 is a webbed housing 5 of cruciform shape furnished with a pair of vertically bored bosses 6 and 7 which member is pivotally secured in position by a vertical stud or shaft 16 passed through the bored bosses 6 and 7 and journalled in the bearings 14, 15. The stud 16 is preferably of two different diameters as illustrated in FIGURE 2 and may be locked by a grub-screw 18.

Two further horizontal studs or shafts 19 and 20 are thereafter introduced from opposite directions into the bearings 10 and 11 and into horizontal bores in the bosses 8 and 9 of the housing 5 until the inner ends of the said studs abut with the stud 16. Grub screws 18 may also be employed for securing the studs 19 and 20.

It will be observed on referring to FIGURE 2 of the drawings that the several studs or shafts 16, 19, 20 are disposed in cruciform manner within the housing 5, i.e. in right-angled relationship.

At all times during use of a tractor-trailer assembly according to the invention, the two vehicles are capable of movement relative to each other about the vertical stud or shaft 16 through a wide angle in a horizontal plane. Whenever rough or uneven terrain is encountered, the off-side wheels of the tractor are permitted to rise or fall relative to the corresponding wheel of the trailer, or vice-versa, by reason of the twisting movement which the tow-bar is allowed to make about the studs or pins 19 and 20; and simultaneously with any of the aforesaid movements the tow-bar may pivot up and down about the pins 4. Throughout these motions the assembly is correctly and strongly supported between the rear axle of the tractor and the trailer frame.

It is possible by employing the invention not to interfere with the driver's observation and should a cab form part of the tractor the trailer would not conflict therewith.

Any suitable means may be included in the design of the tractor-trailer vehicle for providing independent movement or suspension of the trailer wheels and for facilitating lubrication of the studs by providing ducts 21.

The trailer may incorporate any suitable well-known brake mechanism under the control of the driver and hydraulic or other tipping gear may be associated with the trailer hopper or body, a fragmental part of a hydraulic pipe being shown in broken lines at 22 in FIGURE 2.

I claim:

1. A composite articulated vehicle of the tractor-trailer type comprising a tow-bar having a pair of arms; means for pivotally connecting the forward ends of the tow-bar arms to the tractor at laterally spaced apart positions adjacent the rear axle of the tractor; a plurality of bearings connected to the tow-bar arms toward the rear ends thereof, the bearings having mutually aligned bores which are parallel to the vertical plane which passes through the longitudinal center line of the tractor; a trailer frame having a central extension with a forked end; a bearing on each limb of the forked end, the said bearings having mutually aligned vertical bores; a housing pivotally mounted between the said bearings of the tow-bar arms and embraced along one axis by the said bearings of the tow-bar arms and along an axis perpendicular thereto by the limbs of the forked end; a first pair of opposed bosses on said housing, each boss having a vertical bore which is aligned with the vertical bore of the other boss; a first pivot stud within the bores of the first pair of bosses, which stud is also within the bearings on the limbs of the forked end; a second pair of opposed bosses on said housing, each boss having a horizontal bore which is aligned with the horizontal bore of the other boss and is parallel to the vertical plane which passes through the longitudinal center line of the tractor; a second and a third pivot stud, each of which is within the bore of one of the said second pair of opposed bosses and each of which is also within the bore of the adjacent bearing of the tow-bar arm, whereby said tow-bar and said trailer frame extension are connected together in articulated manner permitting relative movement therebetween about a vertical axis and about a horizontal longitudinal axis.

2. A composite articulated vehicle of the tractor-trailer type comprising a tow-bar having a pair of arms; means for pivotally connecting the forward ends of the tow-bar arms to the tractor at laterally spaced apart positions adjacent the rear axle of the tractor; a plurality of bearings connected to the tow-bar arms toward the rear ends thereof, the bearings having mutually aligned bores which are coincident with the vertical plane which passes through the longitudinal center line of the tractor; a trailer frame having a central extension with a forked end; a bearing on each limb of the forked end, the said bearings having mutually aligned vertical bores; a housing having a cruciform shape pivotally mounted between the said bearings of the tow-bar arms and embraced along one axis by the said bearings of the tow-bar arms and along an axis perpendicular thereto by the said bearings of the limbs of the forked end; a first pair of opposed bosses on said housing, each boss having a vertical bore which is aligned with the vertical bore of the other boss and perpendicular to the vertical plane which passes through the longitudinal center line of the tractor; a first pivot stud within the bores of the first pair of bosses, which stud is also within the bearings on the limbs of the forked end; a second pair of opposed bosses on said housing, each boss having a horizontal bore which is aligned with the horizontal bore of the other boss and is parallel to the vertical plane which passes through the longitudinal center line of the tractor; a second and a third pivot stud, each of which is within the bore of one of the said second pair of opposed bosses and each of which is also within the bore of the adjacent bearing of the tow-bar arm, whereby said tow-bar and said trailer frame extension are connected together in articulated manner permitting relative movement therebetween about a vertical axis and about a horizontal longitudinal axis.

3. The composite articulated vehicle recited in claim 2 wherein the bores of the first pair of opposed bosses each have a different diameter; and the first pivot stud has two diameters over its length, each diameter being slightly less than a diameter of a bore of the first pair of opposed bosses.

4. The composite articulated vehicle recited in claim 2 wherein the said means for pivotally connecting the forward ends of the tow-bar arms to the tractor is located below and slightly in front of the axis formed by the rear axle of the tractor.

References Cited by the Examiner
UNITED STATES PATENTS

| 1,512,611 | 10/24 | Konetsky | 280—503 X |
| 2,187,970 | 1/40 | Greer | 180—14 X |
| 3,066,952 | 12/62 | Price | 280—415 |

FOREIGN PATENTS 742,469 12/43 Germany.

PHILIP ARNOLD, *Primary Examiner.*
A. HARRY LEVY, *Examiner.*